United States Patent [19]

Heuer

[11] 4,199,676

[45] Apr. 22, 1980

[54] ENCODER

[76] Inventor: Hellmut Heuer, Lee 4,, 2000 Wedel, Fed. Rep. of Germany

[21] Appl. No.: 873,236

[22] Filed: Jan. 30, 1978

[30] Foreign Application Priority Data

Feb. 4, 1977 [DE] Fed. Rep. of Germany ... 7703216[U]

[51] Int. Cl.[2] ...................... G06M 1/00; G06C 27/00; G06F 7/38

[52] U.S. Cl. .......................... 235/61 PD; 235/92 EA; 235/117 R; 340/347 P

[58] Field of Search ......... 235/61 PS, 61 PD, 92 EA, 235/94 R, 117 R, 139 R; 340/347 P, 347 M

[56] References Cited

U.S. PATENT DOCUMENTS

| | | | |
|---|---|---|---|
| 1,391,319 | 9/1921 | Hoecken | 235/139 R |
| 2,929,554 | 3/1960 | Williams | 235/117 R |
| 3,224,673 | 12/1965 | Leonard | 235/117 R |
| 3,262,108 | 7/1966 | Schuman | 340/347 P |
| 3,265,868 | 8/1966 | Devanney | 340/347 P |
| 3,369,746 | 2/1968 | Sieders et al. | 235/94 R |
| 3,721,806 | 3/1973 | Stothart | 235/61 PD |
| 3,910,032 | 10/1975 | Funaki et al. | 235/117 R |

*Primary Examiner*—L. T. Hix
*Assistant Examiner*—Benjamin R. Fuller
*Attorney, Agent, or Firm*—Andrus, Sceales, Starke & Sawall

[57] ABSTRACT

A position encoder has a plurality of measured value embodying carriers mechanically coupled so that those of lower position value drive those of higher position value. The carriers contain encoding step markings (n,m) in which n is the number of encoding step markings per position and m is a whole, even number. For a decade encoder, n equals 10 and m equals 2.

6 Claims, 2 Drawing Figures

ENCODER

BACKGROUND OF THE INVENTION

The present invention relates to a mechanical encoder with a plurality of mutually drivingly connected value embodying carriers with encoding step markings. The encoding step markings of the value embodying carriers contact sensing apparatus for the production of output signals corresponding to the position of the value embodying carriers. A multiple digit mechanical encoder, in which information can be directly read out and/or employed for subsequently driven apparatus, has an input shaft, which for example, is directly connected with a shaft, the rotary position of which is to be determined or monitored, or is connected through a drive with a corresponding shaft or else is connected with a suitable measuring value transducer, which transduces rotary position to a control quantity. The output data of this type of encoder is either a visually readable number and/or a signal represented in a code, which in this form is directly used for control or regulation or else is retransmitted to data processing apparatus.

This type of encoder is used mainly for the measurement of an angle of rotation, an angular position or also a linear displacement, for example, when a rack is arranged in engagement with a pinion.

Conventionally with such encoders the individual value embodying carriers are so coupled with each other, for example, through altered tooth wheels, that after each full revolution of a value embodying carrier, the next higher value, value embodying carrier is respectively further driven a step. However, at present with the direct indication of the encoded results, in particular when the rotary position of the value embodying carriers is read out through contacts, through photoelectrical or magnetic means, so that this data in the form of an electrical signal may be transmitted to data processing apparatus, difficulties result in that during the stepping action, that is during the commutation from one position of the value embodying carrier to the next, an indefinite intermediate condition is passed through. In particular, with multidigit encoders the unavoidable mechanical play between the individual value embodying carriers leads to non-simultaneous switching, or forward movement of the individual value embodying carriers.

With a decimal encoder can, for example, during the transition from 0999 to 1000 also the numbers 0990, 0900, and 0000 be read out and transmitted in the form of electrical signals. With direct indication of numbers, these errors can possibly be corrected; by the indication through electrical, optical, or magnetic devices, is however, error information transmitted to the data processing apparatus. Assume for example, that an apparatus is to be brought to position, which corresponds to the number 1000. In order to save time, the apparatus should be brought, for example, with high speed to the position 0997 and the last three steps should occur, with proportionately slower speed. At this point, after the position 0997 has been obtained, a correspondingly slower transport speed is shifted to; however, with the commutation from 0999 to the number 1000 the intermediate position 0990 is passed through, so the control system could take this as an occurrence to restore the apparatus to acceleration, as noted above, to move the instrument with higher speed to the position 0997. It is evident that known mechanical encoders are not suitable for acceptable control of the referred to equipment.

SUMMARY OF THE PRESENT INVENTION

Through the present invention, in particular, this disadvantage is overcome. Herewith is inventively proposed a mechanical encoder of the initially described type so constructed that on the periphery or on the radial surface of each measured value embodying carrier are mounted encoding step markings (n m) and, on the periphery, or on the radial surface, of value embodying carrier for each respective set of encoding step markings, a shift element is arranged for further driving the value embodying carriers of higher position value by an encoding step, whereby n is the number of the encoding steps per set and m is a whole even number corresponding to the number of shift elements.

The value embodying carriers of the mechanical encoder of the invention provide preferably on the periphery 20 encoding steps, if it comprises a decade encoder, that is, n equals 10 and m equals 2. In a corresponding manner the markings in the radial surfaces of the value embodying carrier can be arranged. In order to correspondingly read out the designation of rotary position of the value embodying carriers, slide contacts can be provided on the peripheral surface or on the radial surface, which correspondingly with conductive and non-conductive regions are in contact. It is also possible, to provide the radial surfaces of the value embodying carriers with slits extending along the peripheral direction and arrange on, one side of the value embodying carrier, one or more light sources and, on the other side of the value embodying carrier, photocells aligned with the individual slits. When the one value embodying carrier has run through ten steps, the correspondingly provided shift elements provide that the value embodying carrier of the next higher position is stepped up by a step.

The value embodying elements can correspondingly with 16 or 32 steps be formed, if they are to be used for the octal or hexadecimal code.

According to a preferred exemplary form of the encoder according to the present invention, the individual embodying elements are coaxially journaled and have switch teeth which are arranged in engagement with an altered tooth wheel. Furthermore on the value embodying carriers a ring gear is mounted, which is arranged in engagement with the tooth wheel. Thusly, through rotation of the value embodying carriers about n steps can the value embodying carriers of the next higher position in a step be further advanced.

According to a preferred exemplary form is the encoding step marking made up out of a plurality of elements arranged next to each other in tracks, whereby the elements of adjacent steps of a value embodying carrier are formed identically to each other but for one of the tracks.

Through the construction of the value embodying carriers according to the invention can a so-called Gray-Code, namely the excess 3 Gray-Code, or else the known Petherick-Code be used. In such codes, only one element is changed from step to step. Such codes are called also single step codes. Such single step codes, as previously named, are reflectingly designed (i.e. reflected binary codes) so that within each value set, so that a plurality of value positions are secured off a single step code. On the basis of the circumstances, that with the transition from one step to another step only one element of a code changes, the danger that false information for the data processing apparatus is produced is correspondingly less.

BRIEF DESCRIPTION OF THE DRAWING

The invention will be further understood through the exemplary drawings.

DETAILED DESCRIPTION OF THE PREFERRED EMBODIMENT

Figure 1:
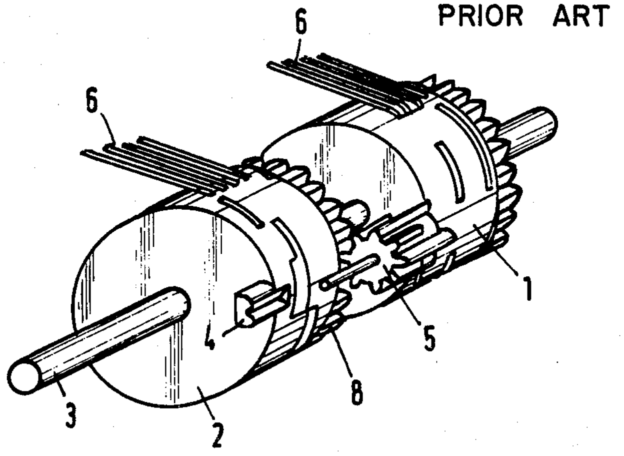
Fig.1 PRIOR ART
FIG. 1 shows a perspective view of two value embodying carriers of a known counter.

FIG. 1 shows a prior art encoder having a pair of carriers. The two value embodying carriers 1 and 2 are represented in the form of drums, which are arranged next to each other on a common axle 3 and are drivingly connected by shift element 4, an altered pinion 5, and a toothed rim 8. The value embodying carrier 1 has on its peripheral surface a row of codings arranged in tracks. Further, the value embodying carrier 1 has a not shown shift element, which, however, is formed correspondingly to shift element 4 provided on value embodying carrier 2. The shift element 4 is situated in the position where the value embodying element 1 further shifts the value embodying element 2 one position by means of pinion 5 and the tooth ring 8. A sliding contact 6 is schematically represented which coacts with the markings on the value embodying elements 1 and 2 and conducts the rotary position of the value embodying elements 1 and 2 in the form of signals in coded form to a not shown data processing apparatus.

Figure 2:
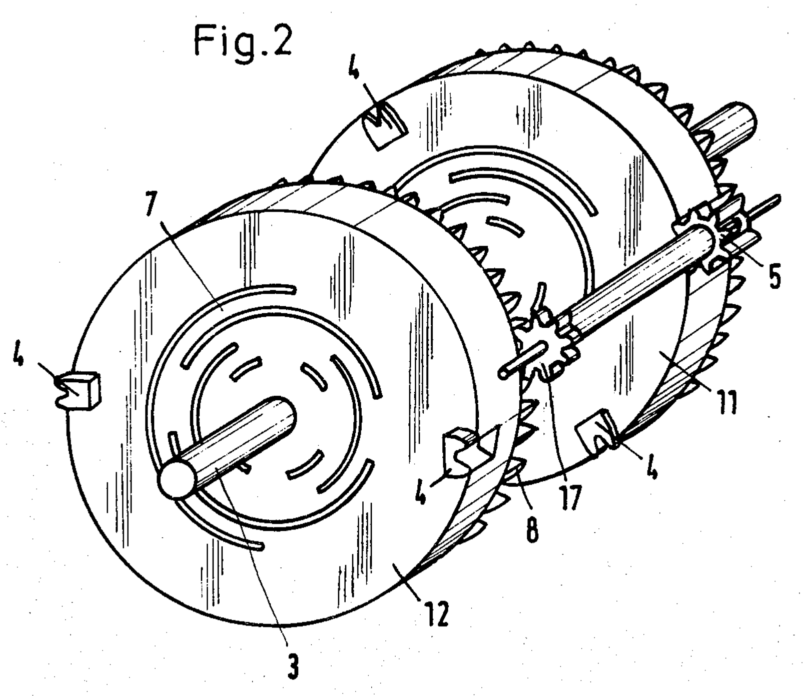
FIG. 2 shows a perspective view of value embodying carriers of an encoder according to the invention.

Value embodying carriers 11 and 12 according to the invention shown in FIG. 2 are essentially formed correspondingly to value embodying elements 1 and 2. They have however, in the illustrated example, double the number of individual steps and moreover, two shift elements 4 are arranged, respectively, on the value embodying carriers 11 and 12, transposed 180° to each other. The value embodying carriers 11 and 12 are rotatingly journalled on the same axle 3, whereby however, they are movable with respect to each other. On the radial surfaces of the value embodying carriers 11 and 12 are markings 7 noted. These are formed as slits, which pierce through the radial surfaces and are arranged between at least one (not shown) light source and at least one (not shown) light actuated apparatus. The markings 7 fulfill operation for the Gray-Code, so that by the step-wise transition from one rotary position to next following rotary position, single one of the markings is changed, while the other three markings remain unchanged.

The value embodying carrier 11 is driven by a not shown driving means, for example, from a shaft, the rotary position of which is to be controlled. Positioning of the shift element 4 in engagement with the altered pinion 5, rotates the pinion shaft, so that the pinion 17 located on the same shaft, which is in engagement with the ring gear 8 of the second value embodying carrier 12 is stepped by one position. By this transition are corresponding signals produced, without thereby passing through undesired intermediate stages as is the case with known counters.

On the front side of the value embodying carrier 12 it is noted that the marking 7, the radial slits, are symmetrically formed to a connecting line of the shift elements 4. In other words, the value embodying carrier 12 passes through with one revolution, for example, with a decade system, twice the numbers from 0 to 9 represented in the reflected code.

With the highest value, value embodying carrier can however, a single step, not reflected code, be used, since to distinguish the reflected parts from the not reflected parts of the code further information is required. With the remaining value embodying carriers is, on the contrary, a single step reflected code necessary in order that for the entire encoder a single step code can be used. The differentiation of the reflected and not reflected parts of the code can here result, for example, in dependence on, whether the next higher value position has an even or an odd value.

The slits or tracks of the encoding step marking sets 7 may be so formed that the element representing steps 0 and n−1 are identically formed, thereby facilitating the transition between these steps. In a decade counter this would be steps 0 and 9 which facilitate the 9 to 10 transition. The odd or even value of the next higher value carrier, referred to above may be used to correct the reading of the encoder.

Merely, exemplarily is the coding provided on the radial surfaces of the value embodying carriers 11 and 12 and executed in form of circumferential slits. Naturally, can, as in the FIG. 1 is shown, the marking also on the peripheral surfaces of the value embodying carriers 11 and 12 be provided according to the invention. A construction can by galvanic contracts, through photoelectric or magnetic means be realized. Further, can more than four single form tracks be provided, with octal counting would for the realization of a single step code, three tracks suffice. Various modes of carrying out the invention are contemplated as being within the scope of the following claims particularly pointing out and distincly claiming the subject matter which is regarded as the invention.

I claim:

1. In a mechanical encoder having a cascaded plurality $(x-x_n)$ of drivingly connected, repetitiously movably positionable value embodying carriers with encoding step markings, said encoding step markings being suitable for operation by sensing apparatus for the production of output signals corresponding to the position of the value embodying carriers, the improvement wherein, on a movable surface of each value embodying carrier (11,12), (m) encoding step markings sets (7) of (n) encoding steps are provided, each of $(x-x_{n-1})$ value embodying carriers (11,12) having (m) shift elements (4) for driving the value embodying carrier (12) of higher position value by an encoding step, (m) being a whole even number, said shift elements being symmetrically spaced on said carriers with respect to the repetitious movement thereof.

2. An encoder according to claim 1 characterized in that the value embodying carriers (11,12) are journaled coaxially.

3. The encodcr according to claim 2 characterized in that the shift element (4) is arranged in engagement with an altered tooth wheel (5) and on the value embodying carrier (11,12) of higher position value, a ring gear, (8) is provided which is arranged in engagement with a pinion (17) driven by said tooth wheel.

4. The encoder according to claim 1 wherein the symmetrically spacing of said shift elements forms sectors in said carriers and wherein each of said sectors contains an encoding step markings set.

5. The encoder according to one of claims 1, 4, 2, or 3, wherein each encoding step marking set on a value embodying carrier is formed to sequentially change, upon the movement of said carrier, for each of the numbers 0 to n−1 of said n encoding steps; said marking sets being so arranged on said value embodying carrier that the 0's of two neighboring sets are adjacent and the n−1's of two neighboring sets are adjacent.

6. The encoder according to claim 5 wherein the encoding step markings on the surface of each value embodying carrier (11,12) are formed out of elements comprising a plurality of adjacent tracks and the elements of adjacent steps of a value embodying carrier (11,12) which represent the numbers 0 to n−1 are formed to change by a single state for each of the numbers 0 to n−1.

* * * * *